UNITED STATES PATENT OFFICE.

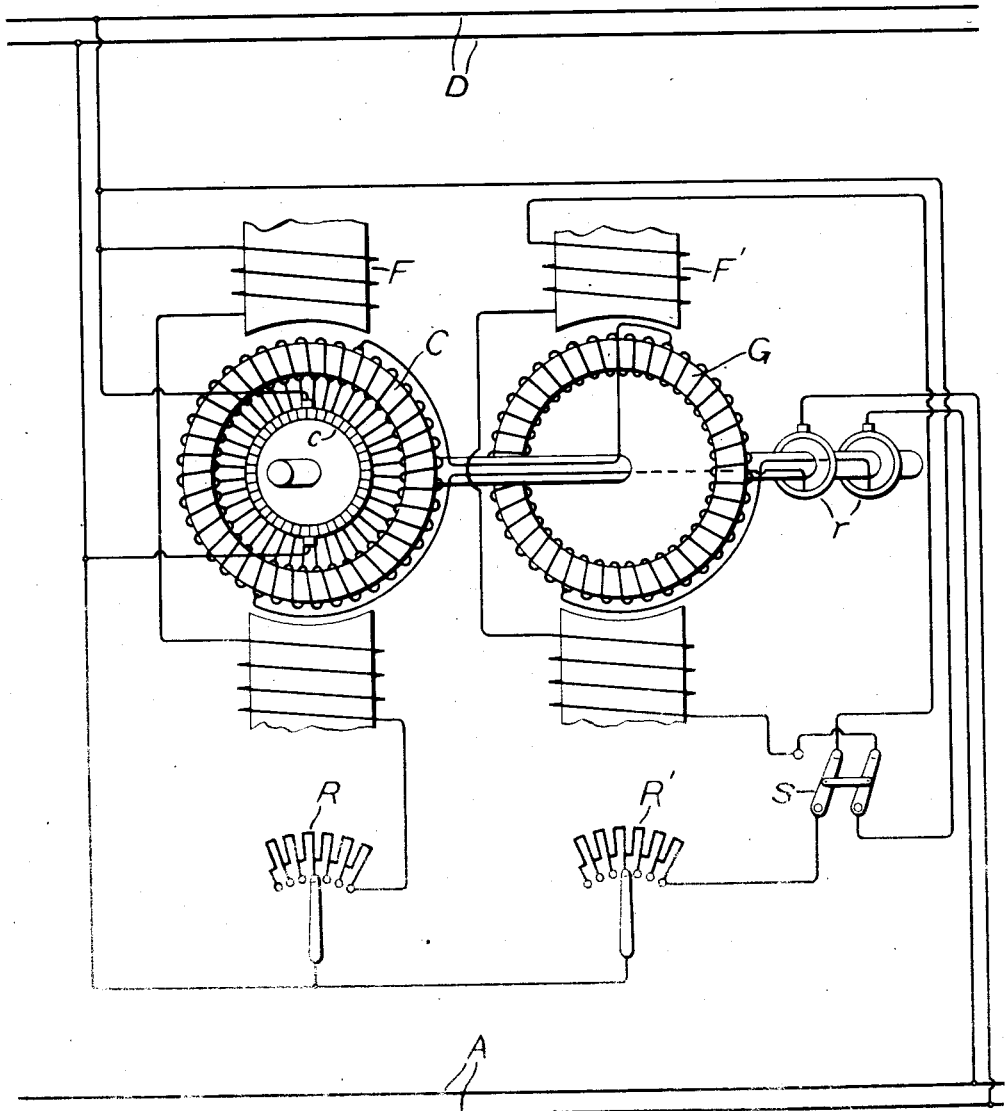

LEONARD WILSON, OF SCHENECTADY, NEW YORK, ASSIGNOR TO GENERAL ELECTRIC COMPANY, A CORPORATION OF NEW YORK.

CURRENT-CONVERTER.

No. 872,549.　　　Specification of Letters Patent.　　　Patented Dec. 3, 1907.

Application filed January 4, 1906. Serial No. 294,565.

*To all whom it may concern:*

Be it known that I, LEONARD WILSON, a subject of the King of Great Britain, residing at Schenectady, in the county of Schenectady, State of New York, have invented certain new and useful Improvements in Current-Converters, of which the following is a specification.

My invention relates to the conversion of direct-current into alternating-current of variable voltage, and its object is to provide a cheaper apparatus for this purpose than has been used heretofore.

When it is desired to convert direct-current at constant voltage into alternating-current of variable voltage an inverted rotary converter can not be employed, since in such a machine the direct and alternating-current voltages bear a fixed relation to each other. It has consequently been customary heretofore, in such a case, to employ a direct-current motor coupled to and driving an alternating-current generator. With such an arrangement each machine must have a capacity equal to the entire amount of energy to be converted. By my invention it is possible to employ for this purpose two machines each of a capacity equal to only one-half of the maximum amount of energy to be converted. I accomplish this result by employing an inverted rotary converter and an alternating-current generator mechanically coupled to the converter and connected in series with the alternating-current side of the converter. The alternating-current generator thus acts as the booster, and by varying its field-strength and reversing its field, the alternating voltage delivered by the set to the alternating-current circuit may be varied from zero to maximum value. When the two machines are delivering the maximum energy to the alternating-current circuit,—that is, when they are operating at maximum voltage, the same current passes through both machines, and each is supplying one-half the voltage. Consequently, the load is divided between the two machines, and each may be of a capacity equal to only one-half the maximum energy to be converted. By controlling the field-strength of the rotary converter, the speed of the set and, consequently, the frequency of the alternating-current delivered may be controlled.

My invention will best be understood by reference to the accompanying drawing, which shows diagrammatically a converter set arranged in accordance with my invention.

In the drawing, D represents a source of direct-current at constant potential, which is connected to the armature C of a rotary converter through the usual commutator c.

F represents the field of the inverted rotary. Mounted on the same shaft with the armature of the inverted rotary is the armature of an alternating-current generator G. This armature is connected in series with the alternating-current side of the rotary converter. One fixed point on the armature winding of the inverted rotary is connected to a corresponding point on the armature of the alternating-current generator. Two points on the respective armatures, displaced one hundred eighty degrees from the points at which the armatures are connected together, are connected to collector-rings r by means of which alternating-current may be supplied to the alternating-current load-circuit A.

The set is shown connected for delivering single-phase current, but obviously it may be arranged for any number of phases by connecting a sufficient number of points on the armatures of the two machines to each other and to collector-rings so as to place the two armatures in series. Two independent rheostats R and R' are placed in circuit with the fields F and F' of the inverted rotary and of the alternating-current generator.

By means of the rheostat R the field-strength of the rotary may be varied, thereby controlling the speed of the set and consequently the frequency delivered to the alternating-current circuit. By means of the reversing switch S in series with the field F' of the alternating-current generator the voltage induced in the generator armature may be made to oppose or to assist the alternating voltage delivered by the inverted rotary, and the amount of the induced voltage in the generator armature may be controlled by means of the rheostat R'.

With the alternating-current generator opposing the inverted rotary and the field-strength of the two machines equal, the voltage at the collector-rings r will be zero. As the field-strength of the alternating-current generator is decreased the voltage delivered to the alternating-current circuit is increased until, when the field of the alternating-current generator is open, the alternating voltage delivered is that of the inverted rotary. Then by reversing the field of the alternating-current generator and gradually increasing its field-strength, the voltage delivered to the alternating-current circuit may be further increased until a maximum is reached equal to the sum of the inverted rotary voltage and the maximum generator voltage.

It will be seen that I have illustrated my invention diagrammatically and that in practice any well-known construction of rotary and generator may be employed.

What I claim as new and desire to secure by Letters Patent of the United States, is:

1. In combination, an inverted rotary converter, and an alternating-current generator mechanically-connected to said converter and having its armature in series with the alternating-current side of the converter and its field in parallel with the direct-current side of the converter, and means for varying at will the field-strength of the generator.

2. In combination, an inverted rotary converter, an alternating-current generator mechanically connected to said converter and having its armature in series with the alternating-current side of the converter, and means for varying the strength of, and for reversing, the field of said generator.

3. In combination, an inverted rotary converter, an alternating-current generator mechanically connected to said converter and having its armature in series with the alternating-current side of the converter, and means for independently varying the field-strengths of both machines.

4. In combination, an inverted rotary converter, an alternating-current generator mechanically connected to said converter and having its armature in series with the alternating-current side of the converter, means for independently varying the field-strengths of both machines, and means for reversing the field of said generator.

5. In a converter from direct to alternating-current, a rotary converter having its armature arranged to be supplied from the direct-current source through a commutator, an alternating-current generator mechanically connected to said rotary converter and having its armature in series with fixed points on the armature winding of the rotary converter, collecting means in series with both armatures, and means for independently varying the field-strength of both machines.

6. In a converter from direct to alternating-current, a rotary-converter having its armature arranged to be supplied from the direct-current source through a commutator, an alternating-current generator mechanically connected to said rotary converter and having its armature in series with fixed points on the armature winding of the rotary converter, collecting means in series with both armatures, means for independently varying the field-strength of both machines, and means for reversing the field of the alternating-current generator.

In witness whereof I have hereunto set my hand this 3rd day of January, 1906.

LEONARD WILSON.

Witnesses:
BENJAMIN B. HULL,
HELEN ORFORD.